June 2, 1964  R. P. PERRINJAQUET  3,135,500
DOMESTIC MIXING APPLIANCE
Filed Aug. 8, 1960  2 Sheets-Sheet 1

INVENTOR
ROGER PAUL PERRINJAQUET
BY Robert Burns
ATTORNEY

June 2, 1964 R. P. PERRINJAQUET 3,135,500
DOMESTIC MIXING APPLIANCE
Filed Aug. 8, 1960 2 Sheets-Sheet 2

INVENTOR
ROGER PAUL PERRINJAQUET
BY Robert A. Burns
ATTORNEY

United States Patent Office 3,135,500
Patented June 2, 1964

3,135,500
DOMESTIC MIXING APPLIANCE
Roger Paul Perrinjaquet, Geneva, Switzerland, assignor to Sovico Societe Anonyme, Lausanne, Switzerland, a company of Switzerland
Filed Aug. 8, 1960, Ser. No. 48,326
18 Claims. (Cl. 259—135)

This invention relates to a motor-driven domestic appliance for culinary use and is more particularly concerned with a portable mixer and to separable beating and whipping members for use therewith.

Electric mixers and beaters of various types have been heretofore proposed and used domestically and industrially. Such mixers, however, are generally heavy and cumbersome and require special mixing bowls for their proper use. Lighter, portable mixers have also been proposed but these devices have not been entirely satisfactory due to lack of the desired beating and whipping efficiency.

It is an object of the present invention to provide a portable, motor-driven mixing appliance which may be used to beat and whip materials of various types in glasses, bowls, pans or other containers.

It is a further object of the invention to provide an appliance of the character indicated which has high efficiency and effectiveness.

It is another object of the invention to provide beating and whipping members of novel construction for use with the appliance described.

In accordance with the invention, there is provided an appliance comprising a motor-driven shaft, a housing for supporting the motor and shaft, a canopy surrounding the shaft and having axially-extending deflector blades parallel with the shaft, and a mixing or beating member supported at the end of the shaft for rotation within the enclosure defined by the blades. In accordance with the invention, mixing or beating members are provided which have portions which rotate in a plane oblique with respect to the axis of the shaft to effect an efficient whipping action.

It is a feature of the invention that the appliance makes possible rapid mixing and whipping in minimum time.

It is another feature of the invention that the oblique whipping member portions may be formed from a single metal sheet.

Other objects and features of the invention will be apparent from the following detailed description of illustrative embodiments of the invention and from the accompanying drawings wherein, FIG. 1 is an elevational view, partly broken away, of an appliance embodying features of the present invention;

FIG. 2a is a sectional view of the construction shown in FIG. 1a taken along the line 2a—2a;

Figure 1:
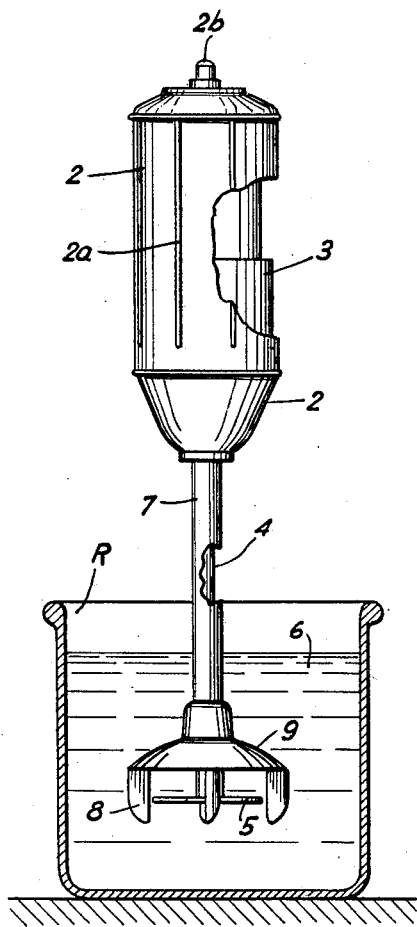
FIG. 1a is a side elevational view of a modified form of the agitating member shown in FIG. 1.
Figure 2:
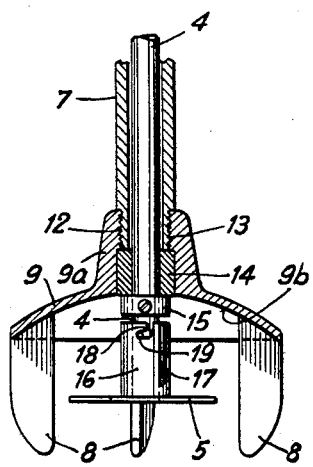
FIG. 2 is an axial sectional view, partly in elevation, of the lower portion of the appliance shown in FIG. 1, showing details of construction on an enlarged scale.
Figure 3:
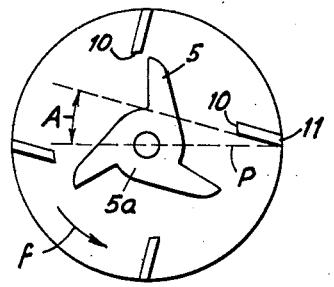
FIG. 3 is a bottom plan view of the structure shown in FIG. 2.

The appliance illustrated comprises a hollow housing 2 of insulating material, such as a synthetic plastic, e.g. a phenol-formaldehyde resin (Bakelite), the dimensions of which are such that it may be held in the hand. The housing 2 contains an electric motor 3 of 8,000 to 10,000 r.p.m. (shown diagrammatically) of known construction coupled to a rotatable shaft 4 which extends axially beyond the housing and which has a free end adapted to support various detachable mixing and/or cutting members, as will be described below. A push-button switch 2b serves to control the energization of motor 3. As seen in FIGS. 1–3, the member 5 has a central body 5a from which extend three angularly-disposed blades. The member 5 is readily formed by stamping or similar operation from an integral rigid flat sheet metal disc.

The shaft 4 extends through a protective tube 7 which is fixedly secured to the housing 2 and which, by means of a canopy 9, carries vertical blades 8 disposed in a circle around the member 5. The blades 8, which extend axially beyond the member 5 in a direction parallel to its axis, are integral at one end with the canopy 9 which covers the rotatable member 5 and which, as seen in FIG. 2, has a convex inner face 9b which serves to confine the material being treated and to facilitate flow of the material from the appliance when the latter is withdrawn. The canopy 9 is integral with a bushing 9a which is provided with an internal thread 12 threadedly engaged with a corresponding external thread 13 formed at the end of the tube 7. This bushing 9a also contains a water-tight packing 14 lightly compressed between the end of the tube 7 and a collar 15 adjustably secured to shaft 4 by means of a set screw or the like in such manner that any play in the shaft is eliminated and the culinary preparation 6 into which the appliance is immersed when in use will be prevented from penetrating into the space between the shaft 4 and the tube 7.

Secured to the central part of the flat metal member 5 is a sleeve or hub 16 extending at right angles to the faces of the cutting and mixing member and frictionally engaged with the free end of the shaft 4. The sleeve 16 is formed with at least one longitudinal slot 17 extending over a portion of its length from its free end toward the member 5, which imparts flexibility to it and permits the sleeve wall to be given a slight permanent inward deformation so that the wall of the sleeve will flex resiliently in an outward direction when the sleeve is placed in position upon the shaft 4, thereby providing the necessary friction between the sleeve and the shaft 4. In addition, the sleeve 16 is formed with a notch 18 at its free end and the shaft 4 carries a radially-projecting pin 19 which engages with the notch 18 when the cutting and/or mixing member is mounted on the shaft 4. The notch 18 is sloped generally in the direction of rotation $f$ of shaft 4, as shown in FIG. 2. The pin 19 causes the sleeve 16 to rotate as soon as a torque which is greater than that of the frictional contact between the sleeve and the shaft occurs by reason of the contact between the material 6 in the container R and the member 5.

As seen in FIG. 3, each of the blades 8 in the embodiment illustrated has parallel side faces and the blades are disposed in such manner that their side faces lie in planes parallel to the axis of the shaft 4, with corresponding faces of the blades being equidistant from this axis. Each blade, however, has two end edge faces which define the width of each blade, which are parallel to the shaft axis and which are at different distances from the axis and a plane P passing through the shaft axis and extending tangentially to the radially outer edge face of the blade, forms an acute angle A with the side faces which may vary between about 10 and 45 degrees. The blades surround the beating member and the direction of inclination of the blades 8 depends upon the direction of rotation of the member 5 in order that the edge face 10 of each blade which is nearest the axis will be more advanced in the direction of rotation f than the outer edge face 11. The effect of the slope A of the blades is to direct inwardly towards the member 5 those portions of the preparation being treated which strike the blades, these portions being caused by the viscosity of the preparation to rotate in the same direction as the member 5. The blades also serve to interrupt the circular movement of the preparation and to create eddies which tend to modify the consistency of the substances which are being acted upon.

The inside edges 10 of the blades, which are shown as rectilinear and parallel to the axis, may, however, extend further inwardly, if desired, in the region above the member 5. The container R illustrated in FIG. 1 may be the one in which the food which is beaten, kneaded or minced by the member 5 is to be served or it may be any other convenient container or mixing bowl.

The appliance illustrated with three cutting blades serves principally for mincing, pulverizing and kneading vegetables and the like used in the making of preparations such as purees, soups, sauces, desserts, such as potatoes, carrots, beans, peas, onions, turnips, and the like.

Figure 1A:
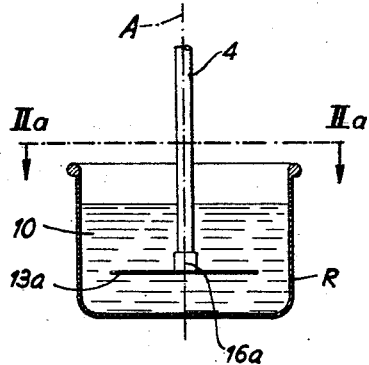
Figure 3A:
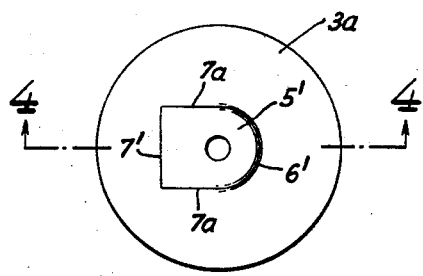
FIG. 3a is a plan view of a beating and whipping disc for use with the appliance of FIG. 1 and having a construction embodying features of the invention.
Figure 2A:
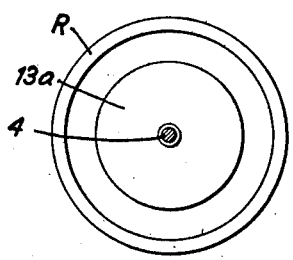
Figure 4:
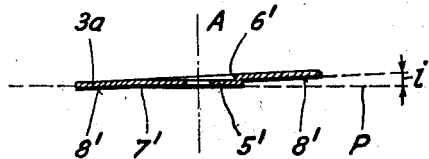
FIG. 4 is a sectional view of the disc shown in FIG. 3a taken along the line 4—4.

As previously mentioned, the mixing and whipping or beating member carried at the end of the rotatable shaft 4 may have different forms and may be embodied in a plurality of different interchangeable units for selective application to the shaft 4. As shown in FIG. 1a, wherein the various parts of the apparatus shown in FIG. 1, except the shaft 4, have been omitted to facilitate the description of the invention, the bladed member 5 of FIG. 1 has been replaced by a flat circular disc 13a provided with a hub 16a having the construction of the hub 16 of the embodiment of FIGS. 1 and 2. For whipping and beating, e.g. for whipping cream and egg whites, making mayonnaise, frappes, custards and the like, the embodiments shown in FIGS. 3a to 8 are particularly effective. All of these embodiments are characterized by the fact that the plane of the major portion of the disc is oblique with respect to the central portion which is at right-angles to the axis of the rod to which the beating member is attached in the appliance. Thus, as shown in FIGS. 3a and 4, a disc, such as shown in FIG. 1a, has been stamped by means of a punch or the like to define a member 3a having a central portion 5' which receives the hub (not shown) for attachment to the rotatable shaft 4, and a peripheral portion 8'. The central portion 5' lies in a plane P which is perpendicular to the axis A of the hub and of the rotatable shaft and the peripheral or second portion 8' forms an oblique angle i with respect to the plane P. The member 3a is suitably formed from a flat integral rigid disc by a punch having one semi-cylindrical or arcuate lateral surface and three rectilinear lateral faces, of which two parallel faces are at right-angles to the third. The end face of the punch is inclined with respect to a plane perpendicular to the lateral faces and thus compels the central portion 5' to form the angle i with the other plane parts 8 of the disc. The stamping of the disc forms in the disc a double, semi-circular or arcuate fold or side 6', the width of which, being at its maximum in the bisecting diametric plane, decreases towards its ends where it joins two parallel double rectilinear folds or sides 7a, the width of which decreases until it is reduced to zero at the points where these folds meet a rectilinear fold or side 7' at right angles to them. The stamping action could be carried out to such a degree that the said fold 7' is itself double. The arcuate side is further offset with respect to the remainder of the disc than the rectilinear sides and the side 7' is connected to the remainder of the disc.

Figure 5:
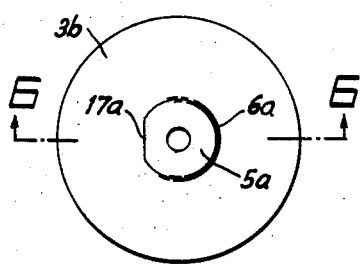
FIG. 5 is a plan view of another beating and whipping disc embodiment.
Figure 6:
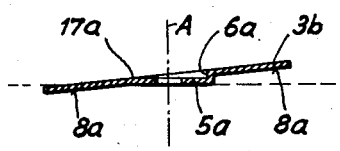
FIG. 6 is a sectional view of the construction of FIG. 5 taken along the line 6—6.

FIGS. 5 and 6 show that stamping of the center of a circular disc could be effected by means of a cylindrical punch having its end face inclined with respect to its axis. It will form the member 3b having a central part or portion 5a in the shape of a segment of a circle, of which the angle at the center is almost 360°. The part 5a is separated from the peripheral parts or second portion 8a by a double fold 6a defining the circular part of the circle segment. The width of the double fold being reduced to zero at the points where it meets a rectilinear fold 17a which forms the straight side of the segment. The said stamping may be effected to such a degree that the double fold 6a forms a complete circle. The side of the central part opposite fold 17a is further offset with respect to the second portion.

Figure 7:
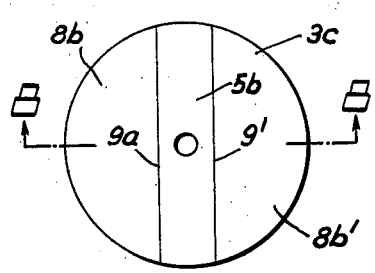
FIG. 7 is a view similar to FIG. 5 of a still further embodiment of the disc of the invention.
Figure 8:
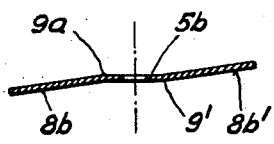
FIG. 8 is a sectional view similar to that of FIG. 6 of the disc shown in FIG. 7.

In the embodiment shown in FIGS. 7 and 8, the central part or portion 5b of the disc 3c is a diametrical band defined by two parallel folds 9a and 9' disposed at equal distances on each side of the axis, but formed in reverse directions, so that the inclined outside parts 8b and 8b' in the form of segments of circles and have their faces parallel to one another. One of said segments is on one side of a plane perpendicular to the axis and the other segment is on the other side of said plane. The folds 9a and 9' could be of different degree so that the parts 8b and 8b' will have different inclinations.

In the embodiments of FIGS. 3a to 8, the acute angle i between the peripheral portions of the discs and the portion at right angles to the axis A may vary between 1° and 10° but preferably is between 4° and 5°. The planes of the peripheral portions slope inwardly from the periphery of the disc toward the axis the angle is measured outwardly from the axis.

When the above described appliance is used, particularly when it is provided with beating and whipping members such as shown in FIGS. 3a to 8, a vertical reciprocating movement is advantageously imparted to it and at the same time it is moved to all parts of the container, the appliance being raised from time to time above the level of the substance being beaten or whipped.

These movements alone are not capable of increasing appreciably the consistency of a cream, for example, so that this improved effect may be attributed to the internal friction of the various parts of the fluid mass set in motion at varying speeds by the rotating disc. Owing to the viscosity of the cream, only those parts which touch the disc are driven at the actual speed of the disc.

It will be understood that each of the discs shown in FIGS. 3a to 8 is provided with a hub of the construction described in connection with hub 16, but these hubs have been omitted in the drawings in order to show more clearly the construction of the disc itself. The hub is secured to the disc by any convenient means known in the metal fabricating art, e.g. welding, brazing, and the like.

It will be obvious that various changes and modifications other than those specifically indicated above may be made in the embodiments illustrated without departing from the scope of the invention as defined in the appended claims. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

This application is a continuation-in-part of my co-pending application, Serial No. 559,041 filed January 13, 1956 (now abandoned).

What I claim and desire to secure by Letters Patent is:

1. A motor-driven domestic appliance for culinary use, comprising, in combination, a portable hollow housing of insulating material containing an electric motor and a rotatable shaft coupled thereto, said shaft extending axially outside said housing and having a free outer end constructed to engage detachably and support a beating member for simultaneous rotation therewith, a protective tube surrounding said shaft and secured to said housing, said tube supporting a closed canopy carrying a plurality of blades extending downwardly from the canopy parallel to the axis of rotation of the shaft, said blades being secured at one end to said canopy to surround said beating member and each having two edge faces which define the width of each blade lying in planes parallel to said axis but disposed at different distances from said axis, the edge face of each blade which is nearest said axis being disposed in front of the other edge face in the direction of rotation of the shaft in such manner that the side faces of each blade form an acute angle with the plane extending through said axis and tangentially to the edge face furthest removed from the axis.

2. A motor-driven domestic appliance for culinary use, comprising, in combination, a portable hollow housing of insulating material containing an electric motor and a rotatable shaft coupled thereto, said shaft extending axially outside said housing and having a free outer end, a protective tube surrounding said shaft and secured to said housing, said tube supporting a canopy carrying a plurality of blades extending parallel to the axis of rotation of the shaft, said blades being secured at one end to said canopy to surround said beating member and each having two edge faces which define the width of each blade lying in planes parallel to said axis but disposed at different distances from said axis, the edge face of each blade which is nearest said axis being disposed in front of the other edge face in the direction of rotation, a beating member detachably engaged with said free outer end of said shaft in such manner that the side faces of each blade form an acute angle of 10° to 45° with the plane extending through said axis and tangentially to the edge face furthest removed from the axis.

3. An appliance as defined in claim 1, wherein the canopy carrying the blades is connected to an internally-threaded sleeve and said sleeve is threadedly engaged with the end of the protective tube.

4. An appliance as defined in claim 3, wherein the sleeve of the canopy carrying the blades houses a water-tight packing, and a ring secured on the shaft holds the packing in place.

5. An appliance as defined in claim 1, wherein the canopy carrying the blades is convex on the side facing the blades.

6. A motor-driven domestic appliance for culinary use, comprising, in combination, a portable hollow housing of insulating material containing an electric motor and a rotatable shaft coupled thereto, said shaft extending axially outside said housing and having a free outer end supporting a detachable beating member for simultaneous rotation therewith, a protective tube surrounding said shaft and secured to said housing, said tube supporting a closed canopy carrying a plurality of blades extending downwardly from the canopy parallel to the axis of rotation of the shaft, said blades being secured at one end to said canopy to surround said beating member and each having two edge faces which define the width of each blade lying in planes parallel to said axis but disposed at different distances from said axis, the edge face of each blade which is nearest said axis being disposed in front of the other edge face in the direction of rotation of the shaft in such manner that the side faces of each blade form an acute angle with the plane extending through said axis and tangentially to the edge face furthest removed from the axis, said beating member comprising a shaped disc having a flat central portion of flat metal secured to a hub which is frictionally engaged on the free outer end of the shaft, the wall of the hub being formed with a notch in its end away from the disc and the shaft having a radially projecting pin extending into the notch for rotating the member.

7. An appliance as defined in claim 6, wherein the hub wall is provided with at least one longitudinal slot extending from the end away from the member and extending along the greater part of its length, the wall being deformed inwardly at its end for resiliently gripping the shaft.

8. A beating member for beating substantially fluid culinary preparations and constructed to be connected with a rotatable shaft, said member being defined by an integral disc of rigid sheet material, said disc having a central portion adapted to be secured to the rotatable shaft with the faces of the central portion perpendicular to the axis of rotation of the shaft, and a second portion having its faces in planes which form with the central portion at least one acute angle having a value which lies between one and ten degrees, the central portion having an arcuate side and three rectilinear sides, one of which is opposite the arcuate side, the arcuate side being further off-set with respect to the second portion of the disc than the rectilinear sides, at least said opposite side being connected to said second portion.

9. A motor-driven domestic appliance for culinary use, comprising, in combination, a portable hollow housing of insulating material containing an electric motor and a rotatable shaft coupled thereto, said shaft extending axially outside said housing and having a free outer end supporting a detachable beating member for simultaneous rotation therewith, a protective tube surrounding said shaft and secured to said housing, said tube supporting a canopy carrying a plurality of blades extending parallel to the axis of rotation of the shaft, said blades being secured at one end to said canopy to surround said beating member and each having two edge faces which define the width of each blade lying in planes parallel to said axis but disposed at different distances from said axis, the edge face of each blade which is nearest said axis being disposed in front of the other edge face in the direction of rotation of the shaft in such manner that the side faces of each blade form an acute angle with the plane extending through said axis and tangentially to the edge face furthest removed from the axis, said beating member comprising a disc of rigid sheet material, said disc having a central portion secured to the rotatable shaft with the faces of the central portion perpendicular to the axis of rotation of the shaft, and a second portion having its faces in planes which form with the central portion at least one acute angle having a value which lies between one and ten degrees, said planes sloping inwardly from the periphery of the disc toward said axis and said angle being measured outwardly from said axis.

10. A motor-driven domestic appliance for culinary use, comprising, in combination, a portable hollow housing of insulating material containing an electric motor and a rotatable shaft coupled thereto, said shaft extending axially outside said housing and having a free outer end supporting a detachable beating member for simultaneous rotation therewith, a protective tube surrounding said shaft and secured to said housing, said tube supporting a canopy carrying a plurality of blades extending parallel to the axis of rotation of the shaft, said blades being secured at one end to said canopy to surround said beating member and each having two edge faces which define the width of each blade lying in planes parallel to said axis but disposed at different distances from said axis, the edge face of each blade which is nearest said axis being disposed in front of the other edge face in the direction of rotation of the shaft in such manner that the side faces of each blade form an acute angle with the plane extending through said axis and tangentially to the edge face furthest removed from the axis, said beating member comprises an integral disc of rigid sheet material, said disc having a central portion secured to the rotatable shaft with the faces of the central portion perpendicular to the axis of rotation of the shaft, and a second portion having its faces in planes which form with the central portion at least one acute angle having a value which lies between one and ten degrees, the central portion having an arcuate side and three rectilinear sides one of which is opposite the arcuate side, the arcuate side being further off-set with respect to the central portion of the disc than the rectilinear sides, but all of said sides being connected to the remainder of said disc, said planes sloping inwardly from the periphery of the disc toward said axis and said angle being measured outwardly from said axis.

11. A motor-driven domestic appliance for culinary use, comprising, in combination, a portable hollow housing of insulating material containing an electric motor and a rotatable shaft coupled thereto, said shaft extending axially outside said housing and having a free outer end supporting a detachable beating member for simultaneous rotation therewith, a protective tube surrounding said shaft and secured to said housing, said tube supporting a canopy carrying a plurality of blades extending parallel to the axis of rotation of the shaft, said blades being secured at one end to said canopy to surround said beating member and each having two edge faces which define the width of each blade lying in planes parallel to said axis but disposed at different distances from said axis, the edge face of each blade which is nearest said axis being disposed in front of the other edge face in the direction of rotation of the shaft in such manner that the side faces of each blade form an acute angle with the plane extending through said axis and tangentially to the edge face furthest removed from the axis, said beating member comprising a disc of rigid sheet material, said disc having a central portion secured to the rotatable shaft with the faces of the central portion perpendicular to the axis of rotation of the shaft, and a second portion having its faces in planes which form with the central portion at least one acute angle having a value which lies between one and ten degrees, the central portion being substantially circular with a single rectilinear portion, the side of the central portion opposite the rectilinear portion being further off-set with respect to the second portion.

12. A motor-driven domestic appliance for culinary use, comprising, in combination, a portable hollow housing of insulating material containing an electric motor and a rotatable shaft coupled thereto, said shaft extending axially outside said housing and having a free outer end axially supporting a detachable beating member for simultaneous rotation therewith, a protective tube surrounding said shaft and secured to said housing, said tube supporting a canopy carrying a plurality of blades extending parallel to the axis of rotation of the shaft, said blades being secured at one end to said canopy to surround said beating member and each having two edge faces which define the width of each blade lying in planes parallel to said axis but disposed at different distances from said axis, the edge face of each blade which is nearest said axis being disposed in front of the other edge face in the direction of rotation of the shaft in such manner that the side faces of each blade form an acute angle with the plane extending through said axis and tangentially to the edge face furthest removed from the axis, said beating member comprising a disc of rigid sheet material, said disc having a central portion secured to the rotatable shaft with the faces of the central portion perpendicular to the axis of rotation of the shaft, and a second portion having its faces in planes which form with the central portion at least one acute angle having a value which lies between one and ten degrees, said central portion having an end face which is inclined with respect to a plane parallel to said axis.

13. An apparatus as defined in claim 12, wherein the central portion of the disc is a diametrical band defined by two parallel folds situated at equal distances on each side of the disc axis and formed in opposite directions, the second portion of the disc being defined by segments of circles inclined along planes which form acute angles with a plane perpendicular to the axis, one being on one side of the said plane and the other being on the other side.

14. A beating member for beating substantially fluid culinary preparations and constructed to be connected with a rotatable shaft, said member being defined by a disc of rigid sheet material, said disc having a central portion adapted to be secured to the rotatable shaft with the faces of the central portion perpendicular to the axis of rotation of the shaft, and a second portion having its faces in parallel planes which form with the central portion at least one acute angle having a value which lies between one and ten degrees, the central portion of the disc being a diametrical band defined by two parallel folds situated at equal distances on each side of the disc axis and formed in opposite directions, and the second portion of the disc being defined by segments of circles inclined along said parallel planes which form acute angles with a plane perpendicular to the axis, one of said segments being on one side of the said last-named plane and the other of said segments being on the other side of said last-named plane.

15. A motor-driven domestic appliance for culinary use, comprising, in combination, a portable hollow housing of insulating material containing an electric motor and a rotatable shaft coupled thereto, said shaft extending axially outside said housing and having a free outer end constructed to engage detachably and support a beating member for simultaneous rotation therewith, a protective tube surrounding said shaft and secured to said housing, said tube supporting a canopy carrying a plurality of blades extending parallel to the axis of rotation of the shaft, said blades being secured at one end to said canopy to surround said beating member and each having two edge faces which define the width of each blade disposed at different distances from said axis, the edge face of each blade which is nearest said axis being disposed in front of the other edge face in the direction of rotation of the shaft in such manner that the side faces of each blade form an acute angle with the plane extending through said axis and the edge face furthest removed from the axis.

16. A motor-driven domestic appliance for culinary use, comprising, in combination, a portable hollow housing of insulating material containing an electric motor and a rotatable shaft coupled thereto, said shaft extending axially outside said housing and having a free outer end constructed to engage detachably and support a beating member for simultaneous rotation therewith, a protective tube surrounding said shaft and secured to said housing, said tube supporting a continuous closed canopy carrying a plurality of blades extending downwardly from the canopy parallel to the axis of rotation of the shaft, said canopy being convex on the side facing said blades, said blades being secured at one end to the peripheral downwardly-curved portion of said canopy to surround said beating member and each having two edge faces which define the width of each blade disposed at different distances from said axis, the edge face of each blade which is nearest said axis being disposed in front of the other edge face in the direction of rotation of the shaft in such manner that the side faces of each blade form an acute angle with the plane extending through said axis and the edge face furthest removed from the axis.

17. A portable kitchen appliance with a motor housing in the form of a handle of insulating material and a drive shaft projecting from the housing and having a free end, a tool detachably mounted upon said free end and being adapted to rotate with said drive shaft to treat a fluid food, means defining beater blades surrounding said tool, said beater blade means being stationary and lying in planes parallel to the rotational axis of the tool and positioned to dip into the food along with the tool, a protective tube enclosing the drive shaft, and a closed canopy having a downwardly-curved edge and being attached to the tool-side end of said tube, said canopy supporting said beater blade means and lying in the area of the food but being positioned to permit the food to move without obstruction laterally back and forth towards the tool.

18. A tool for rapid rotation for the beating of fluid and pasty foods, comprising a round disc of thin and rigid material which is arranged on a shaft constructed to be connected with a motor, the effective surface of the full disc forming an acute angle of at most 10° with a plane extending at right angles to the axis of rotation.

References Cited in the file of this patent

UNITED STATES PATENTS

| | | |
|---|---|---|
| 1,745,412 | Fletcher | Feb. 4, 1930 |
| 2,203,404 | Chace | June 4, 1940 |
| 2,337,806 | Fabrenwald | Dec. 28, 1943 |
| 2,619,330 | Willems | Nov. 25, 1952 |
| 2,700,563 | Krucker | Jan. 25, 1955 |
| 2,716,545 | Dorrough | Aug. 30, 1955 |
| 2,740,696 | Longwell | Apr. 3, 1956 |
| 2,787,448 | Fawcett | Apr. 2, 1957 |
| 2,805,050 | Choppinett | Sept. 3, 1957 |

FOREIGN PATENTS

| | | |
|---|---|---|
| 41,569 | Sweden | Apr. 22, 1913 |
| 275,121 | Switzerland | Feb. 15, 1949 |
| 288,357 | Switzerland | May 16, 1953 |
| 502,600 | Belgium | May 15, 1951 |
| 1,031,483 | Germany | June 8, 1958 |